United States Patent [19]

Braune

[11] Patent Number: 5,854,377
[45] Date of Patent: Dec. 29, 1998

[54] CONTINUOUS PREPARATION OF THERMOPLASTIC POLYESTERS

[75] Inventor: Peter Braune, Erbes-Büdesheim, Germany

[73] Assignee: BASF Aktiengesellschaft, Ludwigshafen, Germany

[21] Appl. No.: 894,747

[22] PCT Filed: Mar. 6, 1996

[86] PCT No.: PCT/EP96/00941

§ 371 Date: Aug. 26, 1997

§ 102(e) Date: Aug. 26, 1997

[87] PCT Pub. No.: WO96/28492

PCT Pub. Date: Sep. 19, 1996

[30] Foreign Application Priority Data

Mar. 16, 1995 [DE] Germany .......................... 19509551.0

[51] Int. Cl.[6] .................................................. C08G 63/00
[52] U.S. Cl. .................. 528/309.1; 528/308; 528/308.6; 528/308.8; 526/71
[58] Field of Search ................................ 528/308, 308.6, 528/308.8, 309.1; 526/71

[56] References Cited

U.S. PATENT DOCUMENTS

| | | | |
|---|---|---|---|
| 3,050,533 | 8/1962 | Munro et al. | 260/346.1 |
| 3,417,057 | 12/1968 | Heinze et al. | 260/75 |
| 3,936,421 | 2/1976 | Hayashi et al. | 260/45.75 |
| 4,014,858 | 3/1977 | Chipman et al. | 260/75 |
| 4,056,514 | 11/1977 | Strehler et al. | 528/274 |
| 4,214,072 | 7/1980 | Sterzel et al. | 528/272 |
| 4,235,844 | 11/1980 | Sterzel et al. | 422/138 |
| 4,329,444 | 5/1982 | Borman | 528/272 |
| 4,680,396 | 7/1987 | Crump et al. | 544/337 |
| 4,824,930 | 4/1989 | Doerr | 528/272 |
| 5,015,759 | 5/1991 | Lowe | 560/91 |

FOREIGN PATENT DOCUMENTS

| | | |
|---|---|---|
| 46670 | 3/1982 | European Pat. Off. . |
| 378884 | 7/1990 | European Pat. Off. . |
| 431977 | 6/1991 | European Pat. Off. . |
| 1135660 | 2/1956 | Germany . |
| 2120092 | 4/1971 | Germany . |
| 2210655 | 3/1972 | Germany . |
| 2514116 | 3/1975 | Germany . |
| 2621099 | 5/1976 | Germany . |
| 2738093 | 8/1977 | Germany . |
| 3544551 | 12/1985 | Germany . |
| 446725 | 7/1964 | Switzerland . |
| 777628 | 6/1957 | United Kingdom . |
| 1320621 | 6/1973 | United Kingdom . |
| 1445034 | 8/1976 | United Kingdom . |
| 1532897 | 11/1978 | United Kingdom . |
| 1544189 | 4/1979 | United Kingdom . |
| 2184129 | 6/1987 | United Kingdom . |

OTHER PUBLICATIONS

Schumann, *Chemiefasern/Textilindustri*, 40/1992 pp. 1058–1062.
*Ullmann's Enc. der Tech. Chem.*, vol. 19, pp. 61–88 "No Date Available".

*Primary Examiner*—Samuel A. Acquah
*Attorney, Agent, or Firm*—Keil & Weinkauf

[57] ABSTRACT

A process for the continuous preparation of thermoplastic polyesters by a) a first step of (trans)esterifying a dicarboxylic acid or its esters or ester-forming derivatives with a molar excess of a dihydroxy compound, b) a second step of precondensing the (trans)esterification product of a), and c) a third step of polycondensing the product of b)

comprises carrying out step a) and/or step b) of the process in two or more temperature zones.

7 Claims, No Drawings

CONTINUOUS PREPARATION OF THERMOPLASTIC POLYESTERS

This application claims the benefit of international application PCT/EP96/00941 filed Mar. 6, 1996.

The present invention relates to a process for the continuous preparation of thermoplastic polyesters by a) a first step of (trans)esterifying a dicarboxylic acid or its esters or ester-forming derivatives with a molar excess of a dihydroxy compound, b) a second step of precondensing the (trans)esterification product of a), and c) a third step of polycondensing the product of b).

Polyesters, especially polyalkylene terephthalates, are widely prepared using (trans)esterification/polycondensation processes in which a first stage involves an esterification or transesterification and the actual polycondensation is carried out in one or more further steps (cf. Chemiefasern/Textilindustrie 40 (1992), 1058–1062, and Ullmann's Enzyklopädie der technischen Chemie, 4th edition, vol. 19, pages 61–88).

DE-A-22 10 655 discloses the esterification of terephthalic acid (TPA) with diols, such as 1,4-butanediol, in the presence of titanium-containing catalysts with subsequent polycondensation in a batchwise manner.

The batchwise preparation starting from TPA is known from DE-A-1135660, DE-A-2120092, DE-A-2621099 and EP-A-46 670.

According to DE-A-35 44 551, the esterification is carried out in one step under reduced pressure at 235°–250° C. This is followed by a second step of reduced pressure precondensation and subsequent polycondensation.

The esterification of TPA with diols in the presence of tin catalysts is known from U.S. Pat. No. 3,936421 and U.S. Pat. No. 4,329,444.

Processes for preparing polyesters starting from dimethyl terephthalate (DMT) and diols are known inter alia from DE-A 2514116 and DE-A 2738 093.

It is evident from the review of the art that the continuous preparation of polyesters is generally problematical, especially with respect to the preparation of polyesters starting from terephthalic acid and predominantly 1,4-butanediol as monomers. At present there is no plant in the world for the continuous preparation of polyesters from TPA and diols including predominantly butanediol.

Nor are there any processes in existence whereby polyester can be prepared selectively starting from TPA or DMT.

It is an object of the present invention to make available a continuous process for preparing polyesters, in particular starting from terephthalic acid, and a process in which the polyester is selectively preparable starting from TPA or DMT. The polyesters obtainable by this process shall have regardless of the starting material a substantially uniform property spectrum such as a low catalyst content, a minimal number of carboxyl end groups, and also be thermally and hydrolytically stable. In addition, the molecular weight of the polyesters should ideally not be subject to any restriction.

We have found that this object is surprisingly achieved on conducting step a) and/or step b) of the process in two or more temperature zones.

Step a) of the process is an esterification or transesterification reaction. It is carried out in at least two, preferably at least three, temperature zones. The temperature of a subsequent zone should be 1°–40° C., preferably 2°–30° C., in particular 5°–10° C., higher than the temperature of the preceding zone. The temperature range for the entire esterification reaction is generally (depending on the starting material) from 200° to 260° C., preferably from 210°–250° C., in particular from 220° to 240° C., and the pressure is generally from 1 to 10, preferably from 1 to 4, in particular from 1 to 2, bar.

Preferably step a) of the process is carried out in two or more temperature zones under substantially identical pressure conditions in the individual zones. The technical requisites for creating different temperature zones, such as apparatus in the form of kettle cascades, for example, are known to the person skilled in the art, making further details superfluous.

Suitable dihydroxy compounds include aliphatic, aromatic or cycloaliphatic diols.

These advantageously have from 2 to 20, in particular from 2 to 12, carbon atoms, and particular preference is given to aliphatic diols having from 2 to 12 carbon atoms, in particular from 2 to 6 carbon atoms.

Specific examples are ethanediol (ethylene glycol), 1,3-propanediol, 1,4-butanediol, cyclohexanediols, hydroquinone, resorcinol and bisphenol A, of which ethanediol and 1,6-butanediol are particularly preferred.

Suitable dicarboxylic acids include aliphatic and/or aromatic dicarboxylic acids having preferably from 4 to 20, in particular from 4 to 12, carbon atoms.

Examples are isophthalic acid, phthalic acid, terephthalic acid, alkyl-substituted derivatives of the aforementioned acids, naphthalenedicarboxylic acids (2,6 and 2,7), aliphatic dicarboxylic acids such as succinic acid, adipic acid, sebacic acid, azelaic acid and decanedicarboxylic acid, of which isophthalic acid and terephthalic acid or mixtures thereof are particularly preferred.

It follows from the above that the process of this invention is particularly advantageous for preparing polyalkylene terephthalates and polyalkylene isophthalates or copolyesters with terephthalic and isophthalic acid as acid component.

In addition to the aforementioned components, the polyesters prepared according to this invention may additionally include minor amounts, advantageously less than 10 mol %, based on the respective monomer component, of further units derived from hydroxycarboxylic acids, for example.

The reaction is customarily carried out with a molar excess of diol in order that the ester equilibrium may be influenced in the desired form. The molar ratios of dicarboxylic acid or dicarboxylic ester:diol are customarily within the range from 1:1.1 to 1:3.5, preferably within the range from 1:1.2 to 1:2.2. Very particular preference is given to molar ratios of dicarboxylic acid:diol of from 1:1.5 to 1:2, and to molar ratios of diester:diol of from 1:1.25 to 1:1.5.

However, it is also possible to carry out the ester reaction in the first zone with a smaller excess of diol and correspondingly to add further amounts of diol in subsequent temperature zones. In the preferred embodiment of the process of this invention, involving 3 temperature zones, the entire diol is subdivided as follows in percentage terms between the 3 zones: from 60 to 85 (1), from 10 to 25 (2) and 5–15 (3), preferably: from 70 to 80 (1), from 10 to 20 (2), from 5 to 10 (3).

The total residence time for step a) is from 140 to 300, preferably from 150 to 260, in particular from 160 to 220, min; the residence time for the first zone is from 100 to 180, preferably from 110 to 150, min; and the residence time for the second zone is from 65 to 140, preferably from 65 to 110, min. In the case of the preferred embodiment involving 3 zones, the residence time in the 3rd zone is from 15 to 40, preferably from 15 to 30, min, the residence time in the 2nd zone is correspondingly shorter and the residence time in the 1st zone is retained as recited above.

In the preferred embodiment of the process of this invention, the residence times decrease from the first zone to the third zone in a ratio of, preferably, 6:3:1.

In step a) of the process of this invention, customary catalysts may also be metered in, preferably into the first temperature zone. Preferred catalysts are titanium compounds and tin compounds as known inter alia from U.S. Pat. No. 3,936,421 and U.S. Pat. No. 4,329,444. The preferred compounds are tetrabutyl orthotitanate and triisopropyl titanate and also tin dioctoate, which are customarily used in step a) in amounts from 20 to 80, preferably from 20 to 70, in particular from 30 to 70, ppm (based on the metal).

To further reduce the carboxyl end group content of the polyester, it can be advantageous to carry out the reaction of the starting monomers in the presence of from 1 to 10 mmol, preferably from 2 to 7 mmol, in particular from 2.5 to 5 mmol, per kg of polyester, of an alkali metal compound or of an alkaline earth metal compound (calculated as alkali metal and alkaline earth metal, respectively). Such compounds are proposed in DE-A 43 33 930. The preferred compounds are sodium carbonate, sodium acetate and sodium alkoxides, in particular sodium methoxide.

For a better, lighter color and thermal stabilization, it can be advantageous to add further additives such as phosphines, phosphites and/or sterically hindered phenols in amounts of up to 1% by weight, preferably up to 0.5% by weight. Appropriate compounds are known to the person skilled in the art. Specific examples are triphenylphosphine, triphenyl phosphite, di-tert-butylphenol and di(tri-t-butylphenol).

The (trans)esterification products are subsequently continuously transferred into the precondensation step b).

Precondensation step b) has at least two, preferably at least three, in particular at least four, temperature zones. The temperature of a zone is from 1° to 40° C., preferably 2°–30° C., in particular 5°–20° C., higher than the temperature of the preceding zone. The temperature range for the entire precondensation is generally (depending on the starting materials) within the range from 220° to 300° C., preferably within the range from 225° to 290° C., in particular within the range from 240° to 290° C.

The precondensation is preferably carried out with a pressure of from 0.5 to 1 bar, preferably 0.6 to 0.8 bar, in the first zone and a pressure of from 20 to 200, preferably from 25 to 150, mbar, in particular from 50 to 150 mbar, in the second or last zone. The hardware for this can be for example an upright tube bundle reactor, but other suitable reactors are known to the person skilled in the art.

The total residence time for step b) of the process is within the range from 10 to 80, preferably from 15 to 50, in particular from 20 to 40, min.

In a particularly preferred embodiment of the process of this invention, four temperature zones are used in which the temperature increases from zone to zone in the above-described ratios and the pressure decreases from the first to the fourth zone within the limits described. The fourth zone of this preferred embodiment of the tube bundle heat exchanger comprises an apparatus for separating vapor and liquid phase in which the ratio of the capacity of the separating vessel to the capacity in the tubes is preferably within the range from 5:1 to 15:1, in particular within the range from 8:1 to 13:1.

The capacity ratios of the first three zones in this particularly preferred embodiment are configured so that the first zone comprises from 30 to 60%, preferably 50%, the second zone comprises from 20 to 40%, preferably 30%, and the third zone comprises from 10 to 30%, preferably 20%, of the capacity. In what follows, the temperature ranges, pressure ranges and residence times are recited for the particularly preferred embodiment of the process of this invention:

1st zone: temperature from 230° to 270° C., preferably from 240° to 250° C., pressure from 0.6 to 0.9, preferably from 0.7 to 0.9, bar.
Residence time from 10 to 20, preferably from 13 to 17, min.

2nd zone: temperature from 240° to 280°, preferably from 250° to 270° C., pressure from 0.2 to 0.6, preferably from 0.3 to 0.5 bar.
Residence time from 10 to 20, preferably from 7 to 11 min.

3rd zone: temperature from 250° to 290°, preferably from 260° to 280° C., pressure from 0.1 to 0.3, preferably from 0.1 to is 0.25 bar.
Residence time from 10 to 20, preferably from 4 to 8 min.

4th zone: temperature from 260° to 300°, preferably from 270° to 285° C., pressure from 0.015 to 0.2, preferably from 0.025 to 0.15 bar.
Residence time from 10 to 20, preferably from 4 to 8 min.

The catalysts and further additives mentioned above in connection with step a) of the process can be metered, in the amounts mentioned, into step b) of the process.

Following step b) of the process of the present invention, the polyester prepolymer has a viscosity number of from 15 to 40, preferably from 20 to 30, ml/g, measured as a 0.5% strength by weight solution in 1:1 phenol/o-dichlorobenzene in accordance with DIN 53728 Part 3 (1985) at 25° C.

The polyester prepolymer is then transferred into step c) of the process of this invention. This step c) is preferably carried out as a single stage at temperatures of 240° to 290° C., preferably from 240° to 270° C., in particular from 240° to 265° C. The pressure is from 0.3 to 10, preferably from 0.3 to 5, in particular from 0.3 to 2, mbar.

The residence times are customarily from 30 to 180, preferably from 35 to 150, min.

During the polycondensation it is possible and preferable to effect a surface renewal of the product. Surface renewal means that new polymer constantly arrives at the surface of the melt, facilitating the leaving of the diol.

The surface renewal rate is preferably within the range from 1 to 20, in particular from 1.5 to 6, $m^2$ per kg of product per minute.

It can also be of advantage to add catalysts and other additives, as described above, in this step of the process as well.

The product is then devolatilized, extruded as a strand, cooled and granulated, by means of customary equipment.

After polycondensation, the polyester generally has a viscosity number of from 60 to 160, preferably from 70 to 155, ml/g, determined in a 0.5% strength by weight solution in 1:1 w/w phenol/o-dichlorobenzene at 25° C. in accordance with DIN 53728 Part 3 (1985).

The carboxyl end group content (in meq/kg of polyester) is generally within the range from 10 to 50, preferably within the range from 15 to 40, and in particular within the range from 15 to 30.

The carboxyl end group content is customarily determined by titration methods, for example potentiometry. The residual catalyst content is advantageously not more than 150, in particular not more than 120, ppm, based on the metal (eg. Ti or/and Sn). To obtain higher molecular weights it is additionally possible to subject the polyester to a further thermal treatment (solid state postcondensation, also known as tempering).

For this, the granular product is continuously or batchwise condensed to the desired viscosity number in the solid state under an inert gas at a temperature below the melting point, for example within the range from 170° to 220° C.

Batchwise solid state condensation can be carried out for example in screw mixers or tumble dryers, and continuous solid state condensation can be carried out in tempering tubes under a flow of hot inert gas. Preference is given to continuous solid state condensation, and the inert gas used is preferably nitrogen.

The viscosity number measured on a 0.5% strength by weight solution in 1:1 o-dichlorobenzene/phenol at 25° C. following the solid state postcondensation is generally within the range from 100 to 300, preferably from 150 to 220, ml/g. The process of this invention can be used to produce polyesters on a continuous basis not only starting from dicarboxylic acids such as, for example, terephthalic acid but also from diesters such as, for example, dimethyl terephthalate. Regardless of the starting material, the products have a low residual catalyst content, a low carboxyl end group content and good thermal and hydrolytic stability. In addition, polyesters of high molecular weight are obtainable.

The process of this invention will now be more particularly described by way of example with reference to the preparation of polybutylene terephthalate (PBT); however, it may emphasized that the process is also suitable for preparing other polyesters known to a person skilled in the art.

EXAMPLES

1) Preparation of polybutylene terephthalate starting from terephthalic acid 306 g (1.84 mol) of terephthalic acid (TPA) and 332 g (3.68 mol) of 1,4-butanediol were fed into the first temperature zone (stirred kettle) for esterification. At the same time 30 ppm of Ti (as tetrabutyl orthotitanate), based on 1 kg of PBT, were added.

The temperatures in the three zones were 225°/230°/235° C. in that order, and the pressure was 1 bar in all three zones. The residence times were 125/60/20 min.

The vapors obtained, which contained excess butanediol, terephthalic acid, THF and water, were fed to columns where butanediol and THF were recovered.

With a conversion of >95% the esterification product was fed to the base of an upright tube bundle reactor. In the first zone the temperature was 245° C., the pressure 0.85 bar and the residence time 15 minutes.

The product climbed continuously upward in the tubes. In the second zone the temperature was 260° C., the pressure 0.40 bar and the residence time 9 minutes. In the third zone the temperature was 270° C., the pressure 0.20 bar and the residence time 6 minutes.

In the fourth zone 60 ppm of Ti (as tetrabutyl orthotitanate) were metered in, based on 1 kg of PBT, and also 3 ppm of Na (as sodium methoxide, 30% in methanol).

In the fourth zone the temperature was 285° C., the pressure 0.08 bar and the residence time 5.5 minutes.

Excess butanediol and reaction products such as THF and water were withdrawn at the upper end of the tube bundle heat exchanger and worked up.

The precondensate was then (at 280° C.) transferred into a postcondensation reactor (step c). At the same time 30 ppm of Ti (as tetrabutyl orthotitanate) were metered in, based on 1 kg of PBT, and also 3 ppm of Na (as sodium methoxide, 30% strength in methanol). The pressure was within the range from 0.5 to 2.5 mbar. Accordingly, rapid cooling occurred in the entry zone of the reactor with a simultaneous increase in the viscosity of the product. The polycondensation was completed at 250°–260° C.

1a) A residence time of 40 min, a pressure of 0.5 mbar, a temperature of 258° C. and a surface renewal rate of 2.8 m$^2$ per kg of PBT per minute resulted in a viscosity number of 130 ml/g (measured as 0.5% strength by weight solution in 1:1 phenol/o-dichlorobenzene at 25° C.).

1b) A residence time of 105 min, 0.5 mbar, 255° C. and 4.8 m$^2$ per kg of PBT per minute resulted in a viscosity number of 155 ml/g.

2. Preparation of PBT starting from dimethyl terephthalate 194 g (1 mol) of DMT and 121.5 g (1.35 mol) of 1,4-butanediol were fed into the 1st zone for transesterification. The procedure corresponded to Example 1 under the following conditions:

Step a)
    1st zone: 180° C., 1 bar, 125 min
    2st zone: 190° C., 1 bar, 60 min
    3rd zone: 205° C., 1 bar, 20 min Step b)
    1st zone: 245° C., 0.85 bar, 15 min
    2st zone: 260° C., 0.40 bar, 9 min
    3rd zone: 270° C., 0.20 bar, 6 min
    4th zone: 285° C., 0.08 bar, 5.5 min Step c)
    2a) 258° C., 0.05 mbar, residence time: 40 min 2.8 m$^2$/kg of PBT/min, VN: 130 ml/g
    2b) 105 min, residence time at 255° C., 0.5 mbar 4.8 m$^2$/kg of PBT/min, VN: 155 ml/g The catalyst was added at the point of entry into the 1st zone of step a): 120 ppm of Ti (as tetrabutyl orthotitanate) and 6 ppm of Na (as sodium methoxide, 30% strength in methanol).

Comparison of polyester products of examples 1 and 2

| Example | VN (ml/g) | COOH content (meq/kg of PBT) | Residual catalyst content and other additives (ppm) |
|---|---|---|---|
| Example 1a | 130 | 25 | 120 of Ti/6 of Na |
| 1b | 155 | 30 | 120 of Ti/6 of Na |
| Example 2a | 130 | 20 | 120 of Ti/6 of Na |
| 2b | 155 | 28 | 120 of Ti/6 of Na |

The residual catalyst content was determined by x-ray fluorescence analysis.

The COOH content (carboxyl end group content) was determined as follows:

100 mg of polyester were dissolved in 7 ml of nitrobenzene at 200° C. After cooling to 150° C., 7 ml of a mixture of 2 mg of potassium acetate in 1 l of 10:90 w/w water/isopropanol were added. The potassium became bonded to the COOH groups, releasing acetic acid, which was then titrated potentiometrically.

We claim:

1. A process for the continuous preparation of thermoplastic polyesters by a) (trans)esterification of a dicarboxylic acid or its esters or ester-forming derivatives with a molar excess of a dihydroxy compound, b) precondensation of the (trans)esterification product of a), and c) polycondensation of the product of b), wherein i) the (trans)esterification is carried out in two or more temperature zones and under substantially identical pressure conditions, the temperature of a subsequent temperature zone being 1°–40° C. higher than the temperature of the preceding zone, and ii) the precondensation reaction is carried out in two or more temperature zones, the temperature of a subsequent temperature zone being 1°–40° C. higher than the temperature of the preceding zone.

2. The process defined in claim 1, wherein the (trans) esterification reaction is carried out in 3 or more temperature zones.

3. The process defined in claim 1, wherein the pressure in the first temperature zone of the precondensation reaction is from 0.5 to 1.0 bar and the pressure in the last temperature zone is 26 to 200 mbar.

4. The process defined in claim 1, wherein the precondensation reaction is carried out in 4 or more temperature zones.

5. The process defined in claim 4, wherein the precondensation reaction is carried out in a tube bundle exchanger which, in the $4^{th}$ temperature zone, comprises an apparatus for separating vapor and liquid phase.

6. The process defined in claim 5, wherein the ratio capacity of the separating vessel to the capacity in the tubes is from 5:1 to 15:1.

7. The process defined in claim 4, wherein the pressure in the first temperature zone of the precondensation reaction is from 0.5 to 1.0 bar and the pressure in the last temperature zone is 26 to 200 mbar.

* * * * *